United States Patent
Leung (10) Patent No.: US 11,374,919 B2
(45) Date of Patent: Jun. 28, 2022

(54) MEMORY-FREE ANOMALY DETECTION FOR RISK MANAGEMENT SYSTEMS

(71) Applicant: Okta, Inc., San Francisco, CA (US)

(72) Inventor: Christopher Gabriel Leung, Markham (CA)

(73) Assignee: Okta, Inc., San Francisco, CA (US)

( * ) Notice: Subject to any disclaimer, the term of this patent is extended or adjusted under 35 U.S.C. 154(b) by 101 days.

(21) Appl. No.: 16/951,995

(22) Filed: Nov. 18, 2020

(65) Prior Publication Data

US 2022/0158989 A1    May 19, 2022

(51) Int. Cl.
  *H04L 9/40* (2022.01)
  *G06Q 20/40* (2012.01)

(52) U.S. Cl.
  CPC ..... *H04L 63/0815* (2013.01); *G06Q 20/4016* (2013.01); *H04L 63/1425* (2013.01); *H04L 63/20* (2013.01); *H04L 2463/121* (2013.01)

(58) Field of Classification Search
  CPC . H04L 63/0815; H04L 63/1425; H04L 62/20; G06Q 20/4016
  See application file for complete search history.

(56) References Cited

U.S. PATENT DOCUMENTS

| 8,868,474 | B2 | 10/2014 | Leung et al. | |
|---|---|---|---|---|
| 9,037,607 | B2 | 5/2015 | Chew | |
| 9,652,354 | B2 | 5/2017 | Filimonov et al. | |
| 11,075,931 | B1* | 7/2021 | Warren | H04L 63/1416 |
| 2010/0083361 | A1* | 4/2010 | Fleming | G06F 21/41 726/8 |
| 2014/0179270 | A1 | 6/2014 | Anand | |
| 2014/0250511 | A1* | 9/2014 | Kendall | G06F 21/44 726/6 |
| 2018/0121669 | A1* | 5/2018 | Motwani | G06F 21/44 |
| 2018/0337907 | A1* | 11/2018 | Bhansali | G06F 21/32 |

FOREIGN PATENT DOCUMENTS

KR    10-2020-0019079 A    2/2020

OTHER PUBLICATIONS

Tan, S.C. et al., "Fast Anomaly Detection for Streaming Data," Proceedings of the Twenty-Second International Joint Conference on Artificial Intelligence, Jul. 2011, pp. 1511-1516.
PCT International Search Report and Written Opinion, PCT Application No. PCT/US2021/059574, dated Mar. 10, 2022, eight pages.

* cited by examiner

*Primary Examiner* — Ellen Tran
(74) *Attorney, Agent, or Firm* — Fenwick & West LLP (57) ABSTRACT

A risk management system deploys an anomaly detection method for a target data instance without explicitly storing data processing architectures in memory. The anomaly detection method determines whether the target data instance is an anomaly with respect to a reference set of data instances. In one embodiment, the anomaly detection method mimics traversal through one or more trees in an isolation forest without explicitly constructing or storing the trees of the isolation forest in memory. This allows the risk management system to avoid unnecessary storage and retrieval of parts of each tree that would not be traversed if the tree were constructed. Moreover, the anomaly detection method allows anomaly detection to be efficiently performed within memory-constrained systems.

20 Claims, 5 Drawing Sheets

MEMORY-FREE ANOMALY DETECTION FOR RISK MANAGEMENT SYSTEMS

BACKGROUND

This invention relates generally to anomaly detection, and more particularly to memory-free anomaly detection in risk management systems.

Organizations, such as financial institutions, insurance providers, and government entities, often manage information from a significant number of individual entities that each go through frequent activity. For example, a credit card issuer may have millions of customer accounts that are each associated with purchase activities on a daily basis. Organizations are oftentimes interested in deploying risk management systems to detect "anomalous" activities that deviate from activities that the organization deems as normal or regular for the entity. For example, fraudulent activities such as unauthorized credit card purchases or suspicious login attempts typically appear as anomalies. The anomalies may be identified such that, for example, an owner of the account can be alerted and security credentials for the account can be changed to one with higher security standards.

Typically, information from the organizations are organized as data instances that each characterize the information in terms of one or more features. The risk management system performs anomaly detection by generating data processing architectures, such as machine-learned architectures, that can be applied to determine whether a target data instance is an anomaly. However, this requires significant memory on the part of the risk management system because the data processing architectures have to be stored and retrieved when applied for anomaly detection, leading to slow response times and high memory overhead. This is especially difficult when risk management systems act on behalf of multiple organizations and perform anomaly detection on activities from a significant number of accounts at frequent intervals.

SUMMARY

A risk management system deploys an anomaly detection method for a target data instance without explicitly storing data processing architectures in memory. The anomaly detection method determines whether the target data instance is an anomaly with respect to a reference set of data instances. In one embodiment, the anomaly detection method mimics traversal through one or more trees in an isolation forest without explicitly constructing or storing the trees of the isolation forest in memory. This allows the risk management system to avoid unnecessary storage and retrieval of parts of each tree that would not be traversed if the tree was constructed. Moreover, the anomaly detection method allows anomaly detection to be efficiently performed within memory-constrained systems. For example, the anomaly detection method presented herein can perform anomaly detection in a more computationally efficient manner compared to density-based methods, such as multivariate Gaussian methods. Specifically, density-based methods can require large sample sizes and storage of large data matrices in memory.

Specifically, a set of data instances is obtained as a subsample dataset. Each data instance includes values for one or more features. A begin value is initialized as a starting index value, an end value is initialized as an ending index value, and a path length is initialized as zero. While the begin value does not equal the end value, a feature is selected from the one or more features. Index values from the begin value to the end value are assigned to instances of the subsample dataset. The index values may be assigned based on an ordering of the values for the selected feature. A splitting value is selected within a range of the values for the selected feature in the subsample dataset and a splitting index is determined as the assigned index value of an instance of the subsample dataset associated with a value for the selected feature equal to or less than the splitting value. If a value for the selected feature for the target data instance is less than the splitting value, the end value is set as the splitting index and the subsample dataset for the next iteration is set as a subset of data instances assigned to index values from the begin value to the splitting index. If the value for the selected feature for the target data instance is equal to or greater than the splitting value, the begin variable is set as the splitting index and the subsample dataset for the next iteration is set as a subset of data instances assigned to index values from the splitting index to the end value. The path length may be increased by one, and the process is repeated until the begin value equals the end value, or until a threshold height is reached.

The risk management system may repeat the anomaly detection method for one or more repetitions to determine an ensemble set of path lengths. The risk management system determines whether the target data instance is an anomaly based on an anomaly score computed from the ensemble set of path lengths. In one instance, the anomaly score is higher when the path lengths for the one or more repetitions is lower. A low path length indicates that the target data instance belongs to a low-mass partition of the subsample dataset, and thus, has a higher likelihood of being anomalous with respect to the subsample dataset.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
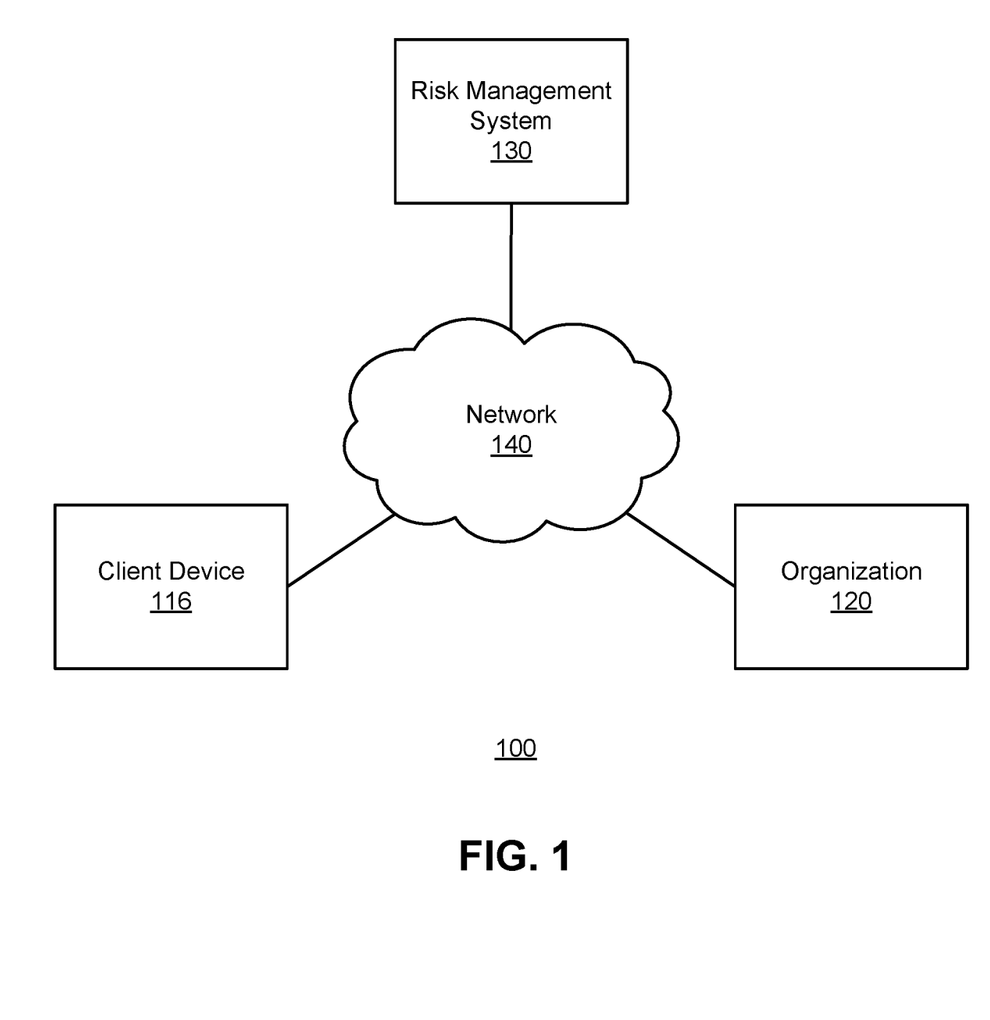
FIG. 1 is a high level block diagram of a system environment for a risk management system, in accordance with an embodiment.

FIG. 1 is a high level block diagram of a system environment for a risk management system 130, in accordance with an embodiment. The system environment 100 shown by FIG. 1 includes one or more client devices 116, a network 140, a risk management system 130, and an organization 120. In alternative configurations, different and/or additional components may be included in the system environment 100.

The organization 120 is an organization, such as a financial institution, an insurance provider, or government organization that may be associated with one or more individual entities. The individual entities may be customers, service subscribers, employees, or other organizations, or the like. For example, the organization 120 may be a business organization and the individual entities may be employees of the business. As another example, the organization 120 may be a credit card issuer and the individual entities may be account holders of credit cards. In one embodiment, the individual entities of the organization 120 may also be associated with a client device 116 that can be used to communicate with the organization 120, subscribe to services provided by the organization 120, perform tasks associated with the organization 120, or the like. For example, an employee of a business organization can login to a user account on the client device 116 to perform tasks for the organization.

In one embodiment, the organization 120 is an authentication system that authenticates requests received from one or more enrolled client devices 116 for access to services of one or more service providers. For example, the authentication system may provide authentication services on behalf of a subscriber organization that owns or otherwise manages the client devices 116. Responsive to a request from an enrolled client device 116, the authentication system may provide a single sign-on capability such that the user of the client device 116 can access multiple services of service providers on the client device 116.

The organization 120 typically manages a significant number (e.g., millions) of individual entities, and has access to information that indicates, for example, activities that have occurred in association with these entities. For example, a credit card issuer may have millions of customer accounts that are each associated with purchase activities on a daily basis. Oftentimes, the organizations 120 are interested in detecting "anomalous" activities that are small in number but deviate from activities that the organization 120 deems as normal or regular for the account. An anomalous activity may significantly differ from typical instances of the activity with respect to one or more characteristics and may be indicative of problems such as fraudulent activity or system malfunctions. For example, a login attempt for a user account that occurs at a physical location remote from where the user typically logs in may be indicative of a suspicious or fake login attempt. Once anomalies are identified, the organization 120 can take appropriate action such as investigating the source of the anomaly.

The organization 120 provides a request to the risk management system 130 to identify anomalies included in information associated with the request. The request may include, for example, activity information describing a sequence of timestamped activities that have occurred for one or more entities of interest. For example, when the organization 120 is an authentication system, the organization 120 may provide activity information describing multiple instances of authentication requests from one or more enrolled client devices 116. In such an example, each authentication request may be a single sign-on or user login activity to a multi-tenant architecture, in which a single instance of software runs on a server and serves multiple tenants. In one instance, the organization 120 may provide the activity information separately to the risk management system 130. In another instance, the organization 120 may grant access to devices that generate the activity information, such that the risk management system 130 has access to the activity as they are generated and can automatically perform anomaly detection on new instances of activity. For example, an authentication system may grant access to the client devices 116 such that the risk management system 130 can access and perform anomaly detection on new instances of authentication requests that were submitted to the authentication system.

Responsive to the request, the organization 120 may receive anomaly information that indicates whether anomalies are present in the activity information of the request. The anomaly information may flag one or more instances in the request as anomalies. Responsive to receiving the anomaly information, the organization 120 may take appropriate action, for example, to investigate the anomaly. For example, when the organization 120 is an authentication system, the organization 120 may investigate whether an anomaly for a user account is a suspicious login attempt and notify the user of the account such that security credentials for the account can be upgraded to prevent such future attempts.

The risk management system 130 receives requests from, for example, the organization 120 to identify anomalies in activity information provided with the requests. The risk management system 130 provides anomaly information indicating anomalies are present in the request. In one embodiment, the risk management system 130 is managed by a separate entity from the organization 120 and provides services to the organization 120 responsive to receiving external requests from the organization 120. In another embodiment, the risk management system 130 is internal to the organization 120. For example, when the organization 120 is an authentication system, the risk management system 130 may be an internal system that accesses and automatically performs anomaly detection on user login information as it becomes available.

The risk management system 130 performs anomaly detection on a set of data instances that characterize the activity information in terms of one or more features. Thus, each of the set of data instances may correspond to a timestamped activity. For example, a data instance may correspond to a user login attempt for a user account, and the one or more features may include a timestamp of the login attempt, location of the login, the user account number associated with the login, and the user's device information such as the model of the user device, the operating system of the user device, and the browser application used for the login attempt. In one instance, the risk management system 130 obtains activity information already organized as data instances from the original requesting entity. In another instance, the risk management system 130 may organize the activity information as data instances after the activity information has been received.

Specifically, the risk management system 130 determines whether target data instances in the activity information are anomalous with respect to a reference set of data instances. The target data instances are data instances for which the risk management system 130 or the organization 120 is interested in anomaly detection. The reference set of data instances are data instances that the target data instance should generally resemble if the target data instance was not an anomaly. In one embodiment, the risk management system 130 performs anomaly detection on a per-entity basis, where the target data instances correspond to instances of activity from one entity, and the reference set of data instances correspond to known instances of activity from the same entity. For example, the target data instances may correspond to new instances of user login attempts for a particular user account, and the reference set of data instances may correspond to previous instances of verified user login attempts for the particular user account that were not flagged as anomalies.

The risk management system 130 may perform anomaly detection by generating data processing architectures, such as statistical model architectures or machine-learned architectures, that can be applied to determine whether target data instances are anomalous. However, this requires significant storage (e.g., long-term storage) on part of the risk management system 130 because the data processing architectures have to be stored and retrieved when used for anomaly detection. For example, statistical model and machine-learned architectures are oftentimes associated with complicated structures and a large number of parameters that take up storage. This memory or storage overhead is especially significant when performing anomaly detection on a per-entity basis and data processing architectures have to be generated for each individual entity of the organization 120. The difficulty is increased when the risk management system 130 provides services on behalf of not one but multiple organizations 120 and anomaly detection has to be performed for a significant number of individual entities in frequent intervals.

Figure 2:
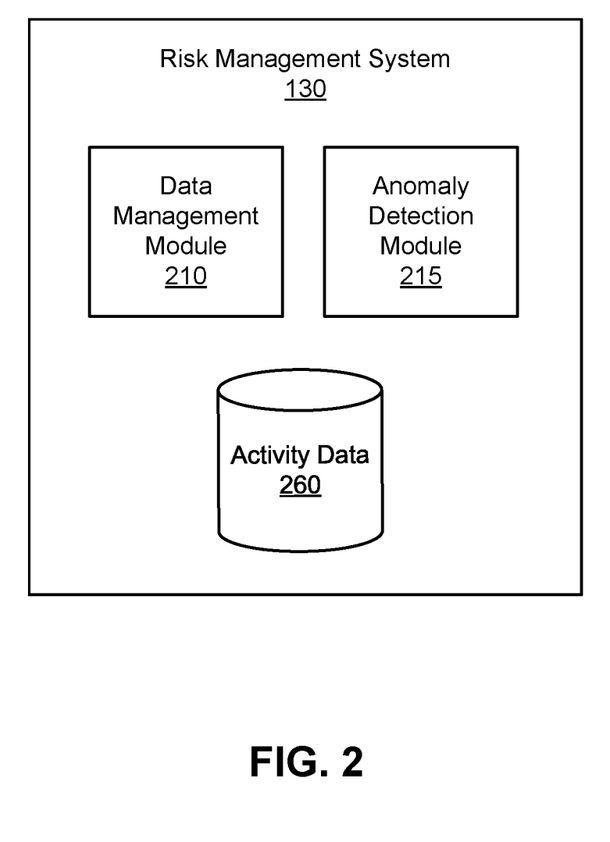
FIG. 2 is a block diagram of an architecture of a risk management system, in accordance with an embodiment.

Thus, in one embodiment, the risk management system 130 deploys an anomaly detection method without explicitly storing data processing architectures in short-term memory or long-term storage, as described in detail in conjunction with FIG. 2. A data processing architecture may be characterized by a set of elements with a particular structure and/or a set of parameters associated with the architecture that were determined beforehand during, for example, a training process. For example, a data processing architecture may include a decision tree having a set of nodes that are structured as parent and children nodes, or a neural network model including layers of nodes connected to each other via edges, the edges associated with a set of parameters.

Specifically, the anomaly detection method determines whether the target data instance is an anomaly with respect to a reference set of data instances. In one embodiment, the anomaly detection method mimics traversal through one or more trees in an Isolation Forest without explicitly constructing or storing the nodes and parameters of the trees of the isolation forest in short-term memory (e.g., random access memory (RAM)) or long-term storage (e.g., disc or flash drive of a server). This allows the risk management system 130 to avoid unnecessary storage and retrieval of parts of each tree that would not be traversed even if the nodes of the tree were constructed. Moreover, the anomaly detection method allows anomaly detection to be efficiently performed within memory-constrained systems.

In addition, while the examples are primarily directed to detecting anomalies on activity information, it is appreciated that the risk management system 130 described herein can perform anomaly detection on other types of information other than activity information, as long as the information can be characterized as a set of data instances with one or more features. For example, the risk management system 130 can perform anomaly detection on a set of data instances representing a population sample of individuals, where each data instance corresponds to a respective individual. As another example, the risk management system 130 can perform anomaly detection on a set of data instances representing the status of a machine, where each data instance corresponds to a state of the machine at a given timestamp as characterized by one or more features. In such an example, the detection of an anomaly may indicate that the machine is in a malfunctioning state.

The network 140 connects the risk management system 130, the organization 120, and the client devices 116. The network 140 may be any suitable communications network for data transmission. In an embodiment such as that illustrated in FIG. 1, the network 140 uses standard communications technologies or protocols and can include the internet. In another embodiment, the entities use custom or dedicated data communications technologies.

Risk Management System

FIG. 2 is a block diagram of an architecture of the risk management system 130, in accordance with an embodiment. The risk management system 130 shown by FIG. 2 includes a data management module 210 and an anomaly detection module 215. The risk management system 130 also includes activity data 260. In alternative configurations, different and/or additional components may be included in the risk management system 130.

The data management module 210 manages and stores activity information as a set of data instances in the activity data store 260 that each characterize an instance of activity in terms of one or more features. The one or more features describe information with respect to one or more characteristics of the activity. For example, a data instance in user login information for authentication requests may include values for features such as a timestamp of the login attempt, location of the login, and the user account number associated with the user login instance. As another example, a data instance in purchase information for a credit card account may include values for features such as a timestamp of the purchase, location of the purchase, a description of the items that were purchased, a subtotal of the purchase, and the account number associated with the purchase. Moreover, when anomaly detection is performed for information other than activity information, it is appreciated that the data management module 210 can also store the information as a set of data instances in the data store 260 in terms of one or more features identified for the information.

The data management module 210 may label the data in the activity data store 260 according to the organization, entity, or any other categorical characteristics associated with the data. In particular, when anomaly detection is performed on a per-entity basis, the activity information includes previous activities that have occurred for the entity, and the data management module 210 may also label or otherwise categorize the activity information on a per-entity basis, such that subsets of data for each respective entity can be easily identified and provided to other modules of the risk management system 130. For example, the label may be an account number of an entity's account with the organization 120, an identification number, such as the social security number (SSN) or tax identification number (TIN) of the entity.

The data management module 210 may also label the data in the activity data store 260 according to whether the data instances are target data instances or reference data instances. For example, the data management module 210 may label or otherwise categorize at least a subset of the data instances for each entity as the reference set of data instances that will be used to determine whether an incoming target data instance for the entity is an anomaly. The data management module 210 may obtain the reference set of data instances as included in the activity information of the request or may obtain the reference set of data instances separately at a previous time before the request for anomaly detection. In one embodiment, the activity data store 260 only stores data instances that are included in the reference set of data instances for anomaly detection. In such an instance, there may be no need for the data management module 210 to label the data as reference data instances.

The data management module 210 continuously updates the data in the activity data store 260 as new data becomes available for storage. For example, the data management module 210 may receive updated data from an organization 120 or may obtain updated data by directly accessing devices that generate new activity information. In one embodiment, the data management module 210 obtains target data instances that were not classified as anomalies from the anomaly detection module 215 and stores such target data instances in the activity datastore 260 as additional reference data instances. For example, the data management module 210 may obtain target data instances for an entity that were not classified as anomalies and add the target data instances to the subset of reference data instances for the respective entity. In one instance, the data management module 210 also continuously discards data instances for an entity that are before a recent time window, such that the reference set of data instances for the entity represents the most recent activity of the entity.

The anomaly detection module 215 receives requests to perform anomaly detection on activity information provided by the requests and provides anomaly information indicating whether anomalies are present in the request. Specifically, as described above, the anomaly detection module 215 deploys an anomaly detection method without explicitly storing data processing architectures in short-term memory or long-term storage. In one embodiment, the anomaly detection method performed by the anomaly detection module 215 mimics traversal through a tree in an isolation forest without explicitly constructing or storing the nodes and parameters of the tree of the isolation forest in storage.

Responsive to receiving the requests, the anomaly detection module 215 obtains target data instances for the request and the respective reference set of data instances for each target data instance. As described above in conjunction with FIG. 1, the anomaly detection module 215 may obtain the target data instances as part of the request, or may have direct access to a stream of activity information as target data instances that are to be continuously monitored by the anomaly detection module 215, such that anomalies can be quickly detected as the new activity information is generated. In one instance, when the anomaly detection module 215 performs anomaly detection on a per-entity basis, the target data instances may be new or recent activity information for the entity, and the reference set of data instances may be activity information on previous activities of the entity that were not classified as anomalies.

For a given target data instance, the anomaly detection method repeatedly partitions the subsample dataset into a set of increasingly granular regions until the target data instance is isolated and no other data instances in the subsample dataset remain for partitioning. Since the features of an anomalous target data instance significantly deviate from those of the subsample dataset, an anomalous target data instance is isolated within a lower number of partitions. On the other hand, a higher number of partitions is needed to isolate the target data instance if the features of the target data instance generally resemble those of the subsample dataset.

Thus, after the anomaly detection method has been performed for the target data instance, the anomaly detection module 215 determines a path length that indicates how many partitions were made to isolate the target data instance. In general, a low path length value indicates that the target data has a higher likelihood of being an anomaly, while a high path length value indicates that the target data has a lower likelihood of being an anomaly. The anomaly detection module 215 subsequently determines an anomaly score that indicates the likelihood that the target data instance is an anomaly. In one embodiment, the anomaly detection module 215 repeats the anomaly detection method one or more times for a given target data instance to generate an ensemble set of path lengths, and the anomaly score is determined based on the ensemble set of path lengths.

Figure 3:
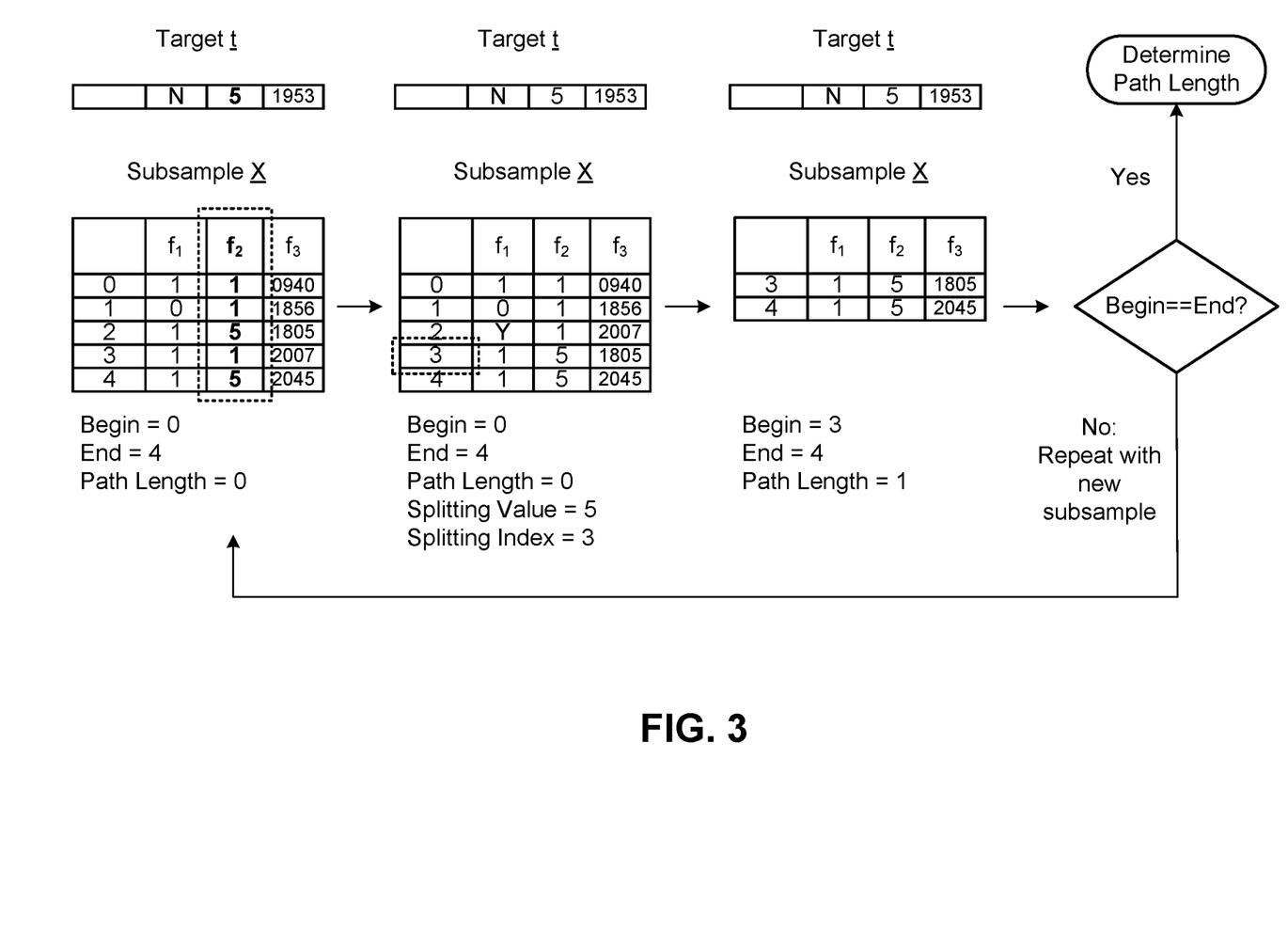
FIG. 3 illustrates an example anomaly detection method for a target data instance, in accordance with an embodiment.

FIG. 3 illustrates an example anomaly detection method for a target data instance, in accordance with an embodiment. Responsive to receiving requests for anomaly detection, the anomaly detection module 215 obtains a subsample dataset from the respective reference set of data instances for the target data instance. The data instances are associated with one or more features. A begin value is initialized as a starting index value, an end value is initialized as an ending index value, and a path length is initialized as zero. As long as the begin value does not equal the end value, the anomaly detection module 215 repeatedly performs one or more iterations. For a current iteration, a feature is selected from the one or more features by, for example, random selection.

FIG. 3 illustrates a target data instance t and a subsample dataset X for the target data instance. Each data instance shown in FIG. 3 may correspond to an instance of user login activity submitted to an authentication system. Specifically, FIG. 3 illustrates an example anomaly detection method performed in conjunction with activity information for a particular user account, where the target data instance t may be a new user login submitted to the authentication system. The anomaly detection module 215 obtains the subsample dataset X from the respective reference set of data instances that include user login activities that previously occurred for the user account. As shown in FIG. 3, each data instance is associated with three features, $f_1$, $f_2$, and $f_3$. Specifically, the values for feature $f_1$ are categorical variables that are 0 if the user login for the data instance was not verified, or 1 if the user login was verified. The values for feature $f_2$ are categorical variables that indicate, for each integer, a respective state where the user login for the data instance occurred. In the example shown in FIG. 3, the value 1 indicates a user login from California, and the value 5 indicates a user login from Florida. The values for feature $f_3$ are numerical variables that indicate a time of the user login attempt. Since the begin value does not equal the end value, the anomaly detection module 215 performs an iteration that starts with selecting a feature from the three features. In the example shown in FIG. 3, the second feature $f_2$ is selected from the set of three features for this iteration.

Moreover, the subsample dataset X that was sampled from the reference set of data instances for the user account includes five data instances that are initially assigned index values from a starting index value of 0 to an ending index value of 4. Accordingly, the anomaly detection module 215 initializes a begin value as a starting index value of 0, an end value as an ending index value of 4, and a path length as 0. Since the begin value does not equal the end value, the anomaly detection module 215 selects a random feature $f_2$ from the three features of the activity information.

The anomaly detection module 215 reassigns index values from the begin value to the end value to instances of the subsample dataset based on an ordering of the values for the selected feature. For example, the index values may be assigned consecutively to data instances after the data instances are rearranged in ascending order of the values of the selected feature. Subsequently, a splitting value is selected within a range of the values for the selected feature in the subsample dataset and a splitting index is determined as the assigned index value of an instance of the subsample dataset associated with a value for the selected feature equal to or less than the splitting value.

As shown in FIG. 3, the anomaly detection module 215 rearranges the subsample dataset X in ascending order of the values of the selected feature $f_2$. The anomaly detection module 215 reassigns the index values 0 through 4 based on the ordering of the values for the selected feature $f_2$. For example, the data instances having values of 1 for the feature $f_2$ are assigned index values 0 through 2, and the data instances having values of 5 for the feature $f_2$ are assigned index values 3 through 4. The anomaly detection module 215 selects a splitting value of 5 that is within a range of the values for the selected feature $f_2$. The anomaly detection module 215 determines a splitting index as the assigned index value of 3 since the data instance with for that index value has a value for the selected feature $f_2$ that is equal to or less than the splitting value of 5 and has the lowest index with this value.

The anomaly detection module 215 partitions the subsample dataset based on the splitting index. In particular, if a value for the selected feature for the target data instance is less than the splitting value, the anomaly detection module 215 sets the end value as the splitting index-1 and the subsample dataset for the next iteration as a partition of data instances assigned to index values from the begin value to the splitting index. Otherwise, if the value for the selected feature for the target data instance is equal to or greater than the splitting value, the anomaly detection module 215 sets the begin variable as the splitting index and the subsample dataset for the next iteration as a partition of data instances assigned to index values from the splitting index to the end value. Thus, the remaining subset of data instances that have a range of values for the selected feature including that of the target data instance are used as the subsample dataset in the next iteration. The path length is increased by one.

As shown in FIG. 3, since the value 5 for feature $f_2$ for the target data instance t is equal to or greater than the splitting value of 5, the anomaly detection module 215 sets the begin value as the splitting index of 3 and the subsample dataset X for the next iteration as the subset of data instances assigned to index values from the splitting index 3 to the end value 4. The path length is increased by one.

This process is repeated for the next one or more iterations until the begin values equals the end value, or only one data instance remains as the subsample dataset. In this manner, the anomaly detection module 215 can repeatedly partition the original subsample dataset into a set of increasingly granular regions until the target data instance is isolated and no other data instances in the subsample dataset remain for partitioning. For example, in FIG. 3, the anomaly detection module 215 may select another feature $f_3$ for the next iteration and repeat the process of assigning a splitting value and a splitting index and partitioning the subsample dataset, until the begin value equals the end value.

In one embodiment, the anomaly detection module 215 may designate a threshold height for the anomaly detection method that represents a maximum number of partitions that can be made to the subsample dataset. In such an instance, the one or more iterations of the anomaly detection method are completed when the begin value equals the end value, or if the path length becomes equal to the threshold height. Setting a threshold height for terminating the one or more iterations in the while loop of the anomaly detection method is useful when the subsample dataset includes an identical or substantially similar copy of the target data instance, since the loop will not terminate in this situation without a hard cutoff designated by the threshold height. In one instance, if the anomaly detection method terminates when the path length becomes equal to the threshold height, the path length for the anomaly detection method is given by the path length plus an adjustment factor adjust(end-begin), where:

$$\text{adjust}(x) = 2 \cdot (\log(x-1) + \varepsilon) - \frac{2 \cdot (x-1)}{x}$$

and end and begin denotes the end value and the begin value, respectively, at the last iteration when the path length equals the threshold height, and $\varepsilon$ is Euler's number.

In one embodiment, the anomaly detection module 215 generates an ensemble set of path lengths by repeating the anomaly detection method one or more times for the target data instance. For example, for each repetition, the anomaly detection module 215 may generate another subsample dataset from the reference set of data instances and repeat the anomaly detection method using the subsample dataset to determine a path length for that repetition. By repeating the anomaly detection method one or more times, the anomaly detection module 215 may obtain a distribution of path lengths that provides a better estimate of whether the target data instance is an anomaly.

The anomaly detection module 215 determines an anomaly score for the target data instance based on the ensemble set of path lengths. In one instance, the anomaly detection module 215 generates an expected score that is, for example, an average of the path lengths in the ensemble set of path lengths, and determines the anomaly score as:

$$\text{normalize}(\text{expected score}, \psi) = 2^{\frac{-\text{expected score}}{\text{adjust}(\psi)}}$$

where expected score is the expected score of the ensemble set of path lengths, or in other words, the average (mean) path length over all the repetitions, and $\psi$ denotes the size of the original subsample datasets used for each repetition of the anomaly detection method. Thus, the anomaly score increases as the path lengths decrease, and the anomaly score decreases as the path lengths increase.

The anomaly detection module 215 determines an anomaly score for each of the target data instances received for the request and determines a response to the request that indicates the presence of anomalies. In one embodiment, the anomaly detection module 215 generates a response by flagging target data instances that have respective anomaly scores above a threshold value or proportion as anomalies. The anomaly detection module 215 may elect to notify the organization 120 of the request only when there are instances of anomalous target data instances. For example, the anomaly detection module 215 may continuously monitor user login activity for each entity for an authentication system as target data instances and alert the authentication system only if the anomaly detection module 215 detects anomalous instances of user login activities.

In one embodiment, the anomaly detection module 215 may identify target data instances that are determined as non-anomalous and provide the non-anomalous data instances to the data management module 210 such that they can be added to the reference set of data instances. For example, the anomaly detection module 215 may provide non-anomalous data instances for user login activity for a particular entity to the data management module 210 such that they can be added to the reference set of data instances for the particular entity. In this manner, the reference set of data instances for the entity can be updated to the more recent activity behavior.

Depending on the value of the anomaly score, the anomaly detection module 215 may also provide a confidence level of how likely the target data instance is an anomaly. For example, the anomaly detection module 215 may include, in the response, risk levels that indicate whether a target data instance has a high risk, a medium risk, or a low risk for being an anomaly. The anomaly detection module 215 may assign a high risk if the anomaly score for the target data instance is above a threshold value or proportion, a low risk if the anomaly score is below a threshold value or proportion, and a medium risk if the anomaly score for the target instance is between the threshold value or proposition for respectively the high risk category and the low risk category.

The anomaly detection module 215 described herein performs the anomaly detection method without explicit storage or retrieval of a data processing architecture, but rather through a while loop that iterates through one or more iterations until a begin value is equal to an end value. Thus, the anomaly detection method can be performed in O(T·n log n) time, where T is the number of repetitions and n is the size of the subsample dataset. In this manner, the anomaly detection module 215 can quickly perform anomaly detection without the need to retrieve data processing architectures, decreasing response time and memory overhead for applications that require anomaly detection in real-time.

Method of Performing Anomaly Detection

Figure 4:
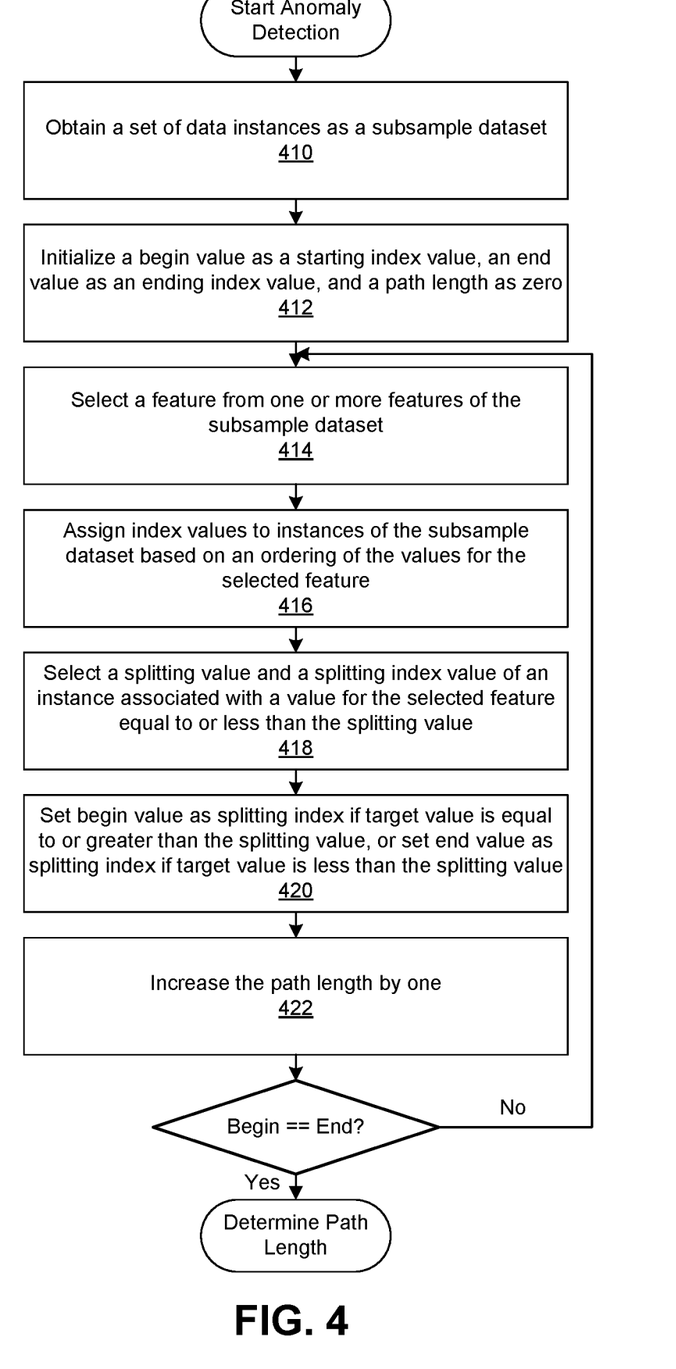
FIG. 4 illustrates a flowchart for performing anomaly detection on a target data instance, in accordance with an embodiment.

FIG. 4 illustrates a flowchart for performing anomaly detection on a target data instance, in accordance with an embodiment. In one embodiment, the steps shown in FIG. 4 are performed by components of the risk management system 130. However, it is appreciated that in other embodiments, the steps shown in FIG. 4 can also be performed by components of the organization 120 or the client devices 116 as the system deems appropriate.

The method illustrated in FIG. 4 can be used, for example, to detect anomalies in user login activity. For example, the risk management system 130 may obtain activity information including a series of user logins associated with a particular user account. The risk management system 130 can continuously monitor user logins for the user account and detect whether, for example, a recent user login attempt is anomalous compared to previous instances of user logins. If so, the risk management system 130 can provide this information to the organization 120 such that actions can be taken to investigate the anomaly.

The risk management system 130 obtains 410 a set of data instances as a subsample dataset. The subsample dataset may be selected from the reference set of data instances for the target data instance. For example, the subsample dataset may contain previous instances of user logins for a user account that were not classified as anomalies, and a target data instance may correspond to the latest instance of user login activity for the user account. The risk management system 130 initializes 412 a begin value as a starting index value, an end value as an ending index value, and path length as zero. For one or more iterations until the begin value equals the end value, the risk management system 130 selects 414 a feature from the one or more features of the subsample dataset. For example, the set of features for user login activity may include location of the login, time of the login, and the like.

The risk management system 130 assigns 416 index values to instances of the subsample dataset based on an ordering of the values for the selected feature. The risk management system 130 selects 418 a splitting value and a splitting index associated with a value for the selected feature equal to or less than the splitting value. The risk management system 130 sets 420 the begin value as the splitting index if the value for the target data instance is equal to or greater than the splitting value, and sets the subsample dataset for the next iteration as a subset of data instance assigned to index values from the splitting index to the end value. Otherwise, the risk management system 130 sets the end value as the splitting index-1 if the value for the target data instance is less than the splitting value, and sets the subsample dataset for the next iteration as a subset of data instances assigned to index values from the begin value to the splitting index. The risk management system increases 422 the path length by one, and repeats one or more next iterations until the begin value equals the end value.

Exemplary Computer Architecture

Figure 5:
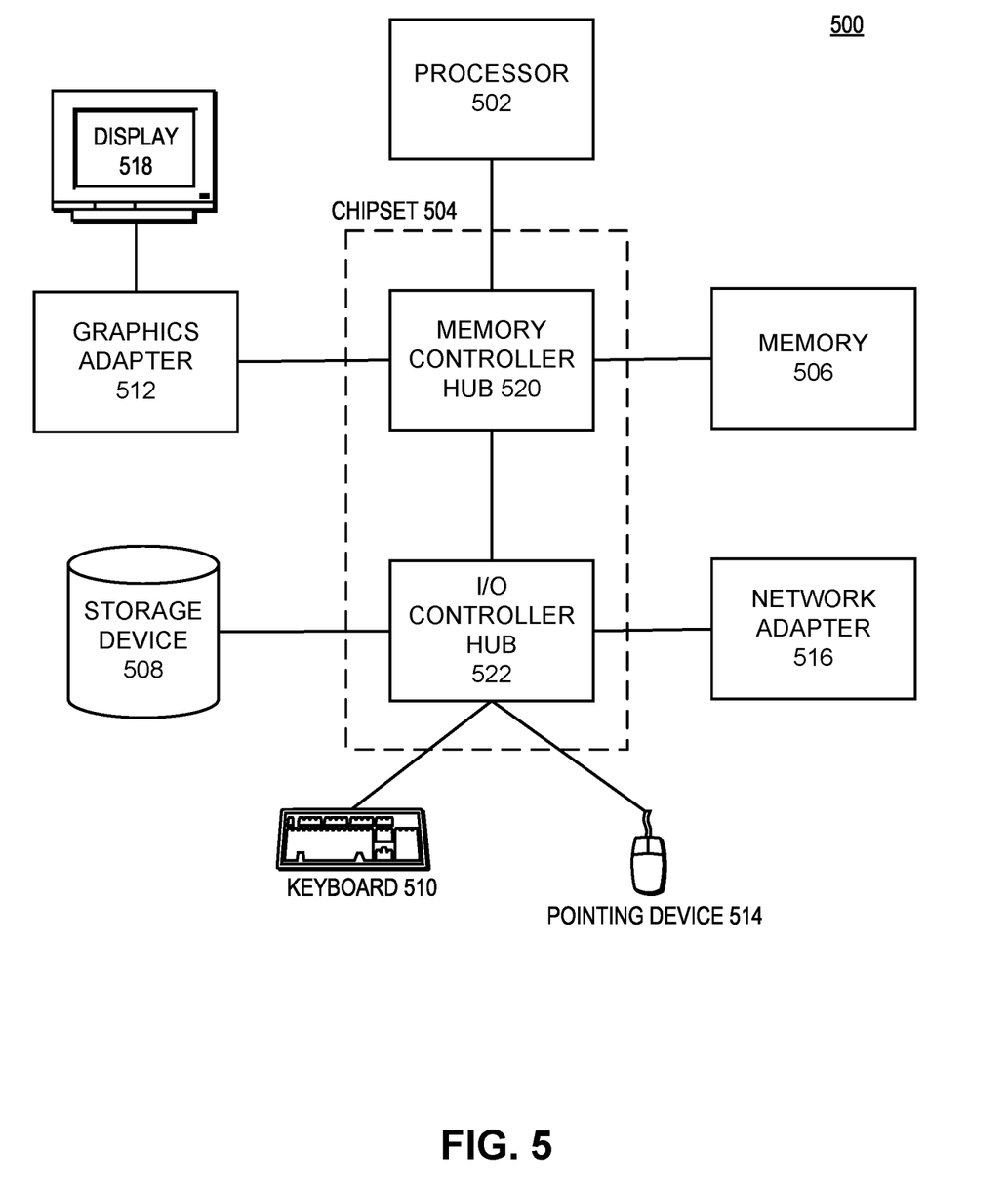
FIG. 5 is a high-level block diagram illustrating physical components of a computer used as part or all of the risk management system, organization, client device of user, in accordance with an embodiment.

FIG. 5 is a block diagram illustrating physical components of a computer 500 used as part or all of the risk management system 130, the organization 120, or the client devices 116, in accordance with an embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500, such as a host or smartphone, may lack a graphics adapter 512, and/or display 518, as well as a keyboard 510 or external pointing device 514. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

SUMMARY

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
    receiving a request, from a client device, for detecting whether a target data instance is an anomaly, the target data instance representing a single sign-on activity for a multi-tenant architecture;
    for each of one or more times, repeatedly performing:
        obtaining a set of data instances as a subsample dataset, each data instance including values for one or more features, and each data instance representing a previous sign-on activity for the multi-tenant architecture;
        initializing a begin value as a starting index value, an end value as an ending index value, and a path length as zero;
        while the begin value does not equal the end value, iteratively performing:
            selecting a feature from the one or more features,
            assigning, to instances of the subsample dataset, index values from the begin value to the end value, the index values assigned based on an ordering of the values for the selected feature,
            selecting a splitting value within a range of the values for the selected feature in the subsample dataset,
            determining a splitting index as the assigned index value of an instance of the subsample dataset associated with a value for the selected feature equal to or less than the splitting value,
            responsive to a value for the selected feature for the target data instance being less than the splitting value, setting the end value based on the splitting index and the subsample dataset as a subset of data instances assigned to index values from the begin value to the splitting index,
            responsive to the value for the selected feature for the target data instance being equal to or greater than the splitting value, setting the begin variable as the splitting index and the subsample dataset as a subset of data instances assigned to index values from the splitting index to the end value, and
            increasing the path length by one;
    determining an anomaly score indicating whether the target data instance is an anomaly based on the path lengths obtained for the one or more times; and
    providing a response to the request based on the anomaly score.

2. The method of claim 1, wherein the method runs in in O(T·n log n) time, where T is a number of the one or more times and and n is a number of instances in the subsample dataset for each time in the one or more times.

3. The method of claim 1, wherein the method is performed without explicitly storing and retrieving a data processing architecture in memory.

4. The method of claim 1, wherein determining the anomaly score further comprises:
    computing an average of the path lengths obtained for the one or more times, and
    applying a normalization function to the computed average, the normalization function increasing as the computed average decreases, and decreasing as the computed average increases.

5. The method of claim 1, wherein the method is performed on a per-entity basis, and the target data instance and the set of data instances in the subsample dataset are instances of activities from a same entity.

6. The method of claim 1, wherein providing the response to the request further comprises:
    determining that the anomaly score is above a threshold value or proportion; and
    responsive to determining that the anomaly score is above the threshold value or proportion, providing a response that the target data instance is an anomaly.

7. A computer-implemented method, comprising:
    receiving a request, from a client device, for detecting whether a target data instance is an anomaly;

for each of one or more times, repeatedly performing:
obtaining a set of data instances as a subsample dataset, each data instance including values for one or more features;
initializing a begin value as a starting index value, an end value as an ending index value, and a path length as zero;
while the begin value does not equal the end value, iteratively performing:
selecting a feature from the one or more features,
assigning, to instances of the subsample dataset, index values from the begin value to the end value, the index values assigned based on an ordering of the values for the selected feature,
selecting a splitting value within a range of the values for the selected feature in the subsample dataset,
determining a splitting index as the assigned index value of an instance of the subsample dataset associated with a value for the selected feature equal to or less than the splitting value,
responsive to a value for the selected feature for the target data instance being less than the splitting value, setting the end value based on the splitting index and the subsample dataset as a subset of data instances assigned to index values from the begin value to the splitting index,
responsive to the value for the selected feature for the target data instance being equal to or greater than the splitting value, setting the begin variable as the splitting index and the subsample dataset as a subset of data instances assigned to index values from the splitting index to the end value, and
increasing the path length by one;
determining an anomaly score indicating whether the target data instance is an anomaly based on the path lengths obtained for the one or more times; and
providing a response to the request based on the anomaly score.

8. The method of claim 7, wherein the method runs in in O(T·n log n) time, where T is a number of the one or more times and and n is a number of instances in the subsample dataset for each time in the one or more times.

9. The method of claim 7, wherein the method is performed without explicitly storing and retrieving a data processing architecture in memory.

10. The method of claim 7, wherein determining the anomaly score further comprises:
computing an average of the path lengths obtained for the one or more times, and
applying a normalization function to the computed average, the normalization function increasing as the computed average decreases, and decreasing as the computed average increases.

11. The method of claim 7, wherein the method is performed on a per-entity basis, and the target data instance and the set of data instances in the subsample dataset are instances of activities from a same entity.

12. The method of claim 7, wherein the target data instance describes an instance of a user login activity, and wherein the one or more features include at least one of a timestamp for the user login, a location of the user login, or a user account associated with the user login.

13. The method of claim 7, wherein providing the response to the request further comprises:
determining that the anomaly score is above a threshold value or proportion; and responsive to determining that the anomaly score is above the threshold value or proportion, providing a response that the target data instance is an anomaly.

14. A non-transitory computer-readable storage medium comprising executable instructions that when executed by a computer processor cause the processor to perform actions comprising:
receiving a request, from a client device, for detecting whether a target data instance is an anomaly;
for each of one or more times, repeatedly performing:
obtaining a set of data instances as a subsample dataset, each data instance including values for one or more features;
initializing a begin value as a starting index value, an end value as an ending index value, and a path length as zero;
while the begin value does not equal the end value, iteratively performing:
selecting a feature from the one or more features,
assigning, to instances of the subsample dataset, index values from the begin value to the end value, the index values assigned based on an ordering of the values for the selected feature,
selecting a splitting value within a range of the values for the selected feature in the subsample dataset,
determining a splitting index as the assigned index value of an instance of the subsample dataset associated with a value for the selected feature equal to or less than the splitting value,
responsive to a value for the selected feature for the target data instance being less than the splitting value, setting the end value based on the splitting index and the subsample dataset as a subset of data instances assigned to index values from the begin value to the splitting index,
responsive to the value for the selected feature for the target data instance being equal to or greater than the splitting value, setting the begin variable as the splitting index and the subsample dataset as a subset of data instances assigned to index values from the splitting index to the end value, and
increasing the path length by one;
determining an anomaly score indicating whether the target data instance is an anomaly based on the path lengths obtained for the one or more times; and
providing a response to the request based on the anomaly score.

15. The non-transitory computer readable medium of claim 14, wherein the executable instructions when executed runs in in O(T·n log n) time, where T is a number of the one or more times and and n is a number of instances in the subsample dataset for each time in the one or more times.

16. The non-transitory computer readable medium of claim 14, wherein the executable instructions when executed is performed without explicitly storing and retrieving a data processing architecture in memory.

17. The non-transitory computer readable medium of claim 14, wherein determining the anomaly score further comprises:
computing an average of the path lengths obtained for the one or more times, and
applying a normalization function to the computed average, the normalization function increasing as the computed average decreases, and decreasing as the computed average increases.

18. The non-transitory computer readable medium of claim 14, wherein anomaly detection is performed on a per-entity basis, and the target data instance and the set of data instances in the subsample dataset are instances of activities from a same entity.

19. The non-transitory computer readable medium of claim 14, wherein the target data instance describes an instance of a user login activity, and wherein the one or more features include at least one of a timestamp for the user login, a location of the user login, or a user account associated with the user login.

20. The non-transitory computer readable medium of claim 14, wherein providing the response to the request further comprises:
- determining that the anomaly score is above a threshold value or proportion; and
- responsive to determining that the anomaly score is above the threshold value or proportion, providing a response that the target data instance is an anomaly.

* * * * *

UNITED STATES PATENT AND TRADEMARK OFFICE
CERTIFICATE OF CORRECTION

PATENT NO. : 11,374,919 B2
APPLICATION NO. : 16/951995
DATED : June 28, 2022
INVENTOR(S) : Christopher Gabriel Leung It is certified that error appears in the above-identified patent and that said Letters Patent is hereby corrected as shown below:

In the Claims

In Column 14, in Claim 2, Line 39, delete "runs in in" and insert -- runs in --, therefor.

In Column 14, in Claim 2, Line 41, delete "and and" and insert -- and --, therefor.

In Column 15, in Claim 8, Line 40, delete "runs in in" and insert -- runs in --, therefor.

In Column 15, in Claim 8, Line 42, delete "and and" and insert -- and --, therefor.

In Column 16, in Claim 14, Line 4, delete "computer-readable" and insert -- computer readable --, therefor.

In Column 16, in Claim 15, Line 52, delete "runs in in" and insert -- runs in --, therefor.

In Column 16, in Claim 15, Line 53, delete "and and" and insert -- and --, therefor.

Signed and Sealed this
Twentieth Day of September, 2022

Katherine Kelly Vidal
*Director of the United States Patent and Trademark Office*